United States Patent
Hansen

(10) Patent No.: US 8,271,285 B2
(45) Date of Patent: Sep. 18, 2012

(54) USING SPEAKER IDENTIFICATION AND VERIFICATION SPEECH PROCESSING TECHNOLOGIES TO ACTIVATE AND DEACTIVATE A PAYMENT CARD

(75) Inventor: Joseph A. Hansen, Coral Springs, FL (US)

(73) Assignee: International Business Machines Corporation, Armonk, NY (US)

( * ) Notice: Subject to any disclaimer, the term of this patent is extended or adjusted under 35 U.S.C. 154(b) by 1403 days.

(21) Appl. No.: 11/832,957

(22) Filed: Aug. 2, 2007

(65) Prior Publication Data
US 2009/0037173 A1 Feb. 5, 2009

(51) Int. Cl.
G10L 11/00 (2006.01)
G10L 21/00 (2006.01)

(52) U.S. Cl. ........ 704/270; 704/246; 704/275; 235/382; 235/382.5

(58) Field of Classification Search .................. 704/246, 704/270; 235/380, 382, 382.5; 705/64, 67, 705/75
See application file for complete search history.

(56) References Cited

U.S. PATENT DOCUMENTS

| | | | | |
|---|---|---|---|---|
| 4,752,676 A * | 6/1988 | Leonard et al. | ............... | 235/379 |
| 5,457,747 A * | 10/1995 | Drexler et al. | ............... | 713/186 |
| 6,100,804 A * | 8/2000 | Brady et al. | ............... | 340/572.7 |
| 6,188,309 B1 * | 2/2001 | Levine | ............... | 340/5.66 |
| 6,282,566 B1 * | 8/2001 | Lee et al. | ............... | 709/217 |
| 6,292,782 B1 * | 9/2001 | Weideman | ............... | 704/273 |
| 6,633,839 B2 * | 10/2003 | Kushner et al. | ............... | 704/205 |
| 6,799,163 B2 * | 9/2004 | Nolan | ............... | 704/273 |
| 7,044,368 B1 * | 5/2006 | Barron | ............... | 235/380 |
| 7,344,068 B2 * | 3/2008 | Register et al. | ............... | 235/382 |
| 7,472,829 B2 * | 1/2009 | Brown | ............... | 235/382.5 |
| 7,574,363 B2 * | 8/2009 | Bodin | ............... | 705/1.1 |
| 7,793,851 B2 * | 9/2010 | Mullen | ............... | 235/493 |
| 2002/0169608 A1 * | 11/2002 | Tamir et al. | ............... | 704/246 |
| 2006/0000892 A1 | 1/2006 | Bonalle et al. | | |
| 2006/0161435 A1 * | 7/2006 | Atef et al. | ............... | 704/246 |
| 2007/0106517 A1 * | 5/2007 | Cluff et al. | ............... | 704/273 |

FOREIGN PATENT DOCUMENTS

| | | |
|---|---|---|
| WO | 0152180 A1 | 7/2001 |
| WO | 0159686 A1 | 8/2001 |

* cited by examiner

*Primary Examiner* — Talivaldis Ivars Smits
*Assistant Examiner* — Shaun Roberts
(74) *Attorney, Agent, or Firm* — Patents on Demand P.A.; Brian K. Buchheit; Scott M. Garrett

(57) ABSTRACT

The present invention discloses a payment card that uses speaker identification and verification (SIV) speech processing techniques for activation purposes and to deactivate the payment card based upon the card user input to the payment card. For example, the invention can initially identify a payment card in a deactivated state, which is an internal state of the payment card. Speech input can then be received. Speech characteristics of the speech input can be determined and compared against a voice print of an authorized card user. The payment card can be selectively activated based on comparison results. That is, when the voice print and the speech characteristics match, the payment card can be activated. Otherwise, the card will remain deactivated. An activated payment card is one that has undergone an internal state change from the deactivated state. For example, when activated a credit card number can appear in a display and a magnetic strip can contain payment information, neither of which are present in the deactivated state.

20 Claims, 3 Drawing Sheets ns when in the internal enabled state and is unable to be utilized for payment transactions when in the internal disabled state.

USING SPEAKER IDENTIFICATION AND VERIFICATION SPEECH PROCESSING TECHNOLOGIES TO ACTIVATE AND DEACTIVATE A PAYMENT CARD

BACKGROUND

1. Field of the Invention

The present invention relates to the field of payment card activation technologies and, more particularly, to using speaker identification and verification speech processing technologies to activate a payment card.

2. Description of the Related Art

When a customer is accepted for a credit card, a contract is formed between the customer and the credit provider, where the customer contractually agrees to reimburse the credit provider for purchased goods. Similarly, a vendor accepting a credit card agrees to immediately provide goods to credit card wielding customers in accordance with a contractual obligation of the credit provider to reimburse the vendor. This system is advantageous to all involved parties, yet is subject to harmful insecurities. A principle insecurity occurs when a fraudulent credit card transaction is conducted, where a card wielder is not the customer authorized to use the card. Fraudulent transactions typically directly and financially harm the credit provider, who still has to pay the vendor for fraudulently obtained goods, but who is not reimbursed by the customer. Vendors and card customers are indirectly harmed in the form of escalated credit provider fees, which the credit provider needs to charge to compensate themselves for moneys lost during fraudulent transactions. Moreover, vendors and card holders involved in fraudulent transactions are often harmed by compensation delays, a period of credit unavailability, obligatory administrative paperwork detailing specifics of the fraudulent transactions, and other frustrations.

To minimize a possibility of fraudulent transactions, many security measures are implemented to minimize fraud. One such security measure is shipping new credit cards in a deactivated state. When a customer receives the card, it is fully disabled and is only enabled once a phone number is called to activate the card. Disablement is external to the payment card meaning that a card provider server disables the card so that any attempted transactions involving the disabled card are denied by the server. Currently, upon activation, personal information is required to establish the identity of the activating person. Conventionally used personal information can often be obtained through web searches or other information gathering techniques. Unauthorized individuals who have acquired a deactivated card can often fraudulently activate it using discoverable personal information, further, once activated a card can be stolen by a non-authorized user and utilized until the theft was detected. Another authentication or security technique is needed to prevent unauthorized users access to credit cards, which would minimize fraudulent transactions.

SUMMARY OF THE INVENTION

The present invention discloses using speaker identification and verification (SIV) speech processing techniques to activate a payment card. A payment card can be any negotiable instrument able to be presented as payment during a transaction. For example, a payment card can be a credit card, a debit card, a gift card, a phone card, a smart card, and the like. A voice print for an authorized speaker can be embedded into the card. Activation can require speech input from a user from which speech characteristics are extracted and compared against the voice print. Activation via the speech input and voice print can occur when a card is initially received, further, the card can be selectively deactivated, which requires a reactivation before it can be used.

In one embodiment, the new payment card can have a self-contained activation/deactivation system. The self-contained activation system can allow a customer to activate/deactivate the new card without the use of any external device. Speech input can be provided to the self-contained activation system, which extracts speaker characteristics from the input and compares these characteristics against the voice print before activating the card. In one implementation, after an established period lapses, an activated card can automatically deactivate itself. The payment card can also include a manual deactivation option. A deactivated card can be one not able to be used as a negotiable or payment instrument.

For example, credit card numbers can only be readable when a card is activated. Further, magnetic strip information needed for a card reader can be disabled when the card is deactivated. Payment cards are not limited to usages that are dependent upon numbers or a magnetic strip and deactivation/activation can be tailored to payment card specifics. For example, a payment card can authenticate itself using a radio frequency identification (RFID) chip containing data which can be obscured or unavailable when a payment card is deactivated. In one embodiment, an activated card can be used with unmodified commercial off-the-shelf (COTS) point of sale (POS) systems. Thus, the present invention can be implemented using existing payment card infrastructures.

The present invention can be implemented in accordance with numerous aspects consistent with the material presented herein. For example, one aspect of the present invention can include a method for activating a payment card. The method can include a step of identifying a payment card in a deactivated state and a step of receiving speech input. The deactivated state is an internal state of the payment card. Speech characteristics of the speech input can be determined and compared against a voice print of an authorized card user. The payment card can be selectively activated based on comparison results. That is, when the voice print and the speech characteristics match, the payment card can be activated. Otherwise, the card will remain deactivated. An activated payment card is one that has undergone an internal state change from the deactivated state.

Another aspect of the present invention can include a payment card that includes an internal enabled and disabled state as well as a state change mechanism. The internal enabled state can be one in which a payment mechanism is active so that the payment card is able to be used for payment transactions. The internal disabled state can be one in which a payment mechanism is deactivated so that the payment card is unable to be used for payment transactions. The state change mechanism can change the payment card from the internal disabled state to the internal enabled state based upon how speech characteristics extracted from speech input compare with a voice print of an authorized card user.

Still another aspect of the present invention can include a payment card system that includes a memory store, an audio transducer, an SIV engine, and an activated card authorized card user. The audio transducer can be configured to receive speech input. The SIV engine can compare speech characteristics extracted from the speech input against the voice print. The activation engine can change the payment card between an internal disabled state and an internal enabled state. The payment card can be able to be utilized for payment transaction when in the internal state is enabled and can be unable to be utilized for payment transactions when in the internal state is disabled.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Currently, there are many forms of identity theft. Identity theft exists because there are insecurities that allow for it. For example, many identifying elements can be duplicated or faked. Such identifying elements can be an identification card such as a driver's license, a signature, a password or secret code, or the like. Certain identifying elements, such as speech characteristics, are currently hard to fraudulently obtain. Such speech characteristics can include tone, pitch variance, speech flow, gender, head size, accent, and the like. When these characteristics are combined, they can form a unique identifiable "voice print" The present invention uses this voice print when activating payment cards. A payment card is defined to include a variety of payment instruments, such as a credit card, a debit card, a gift card, a rechargeable card, a radio frequency identification (RFID) based payment instrument, smart, cards, and the other payment artifacts.

In one embodiment, speech input can be received. Speech characteristics of the speech input can be determined and compared against a voice point of an authorized card user. A payment card can then be selectively activated based on results of the comparing step. Further, in one embodiment additional identity verification can be prompted for. The speech input can be provided responsive to this prompting. This speech input can comprise spoken content that contains the additional identity verification data. The speech input can be speech-to-text converted to obtain a text version of the additional verification data. The payment instrument can be activated only when the additional identify verification data matches previously established values and when a positive comparison between the voice print and the speech characteristic occurs.

Figure 1:
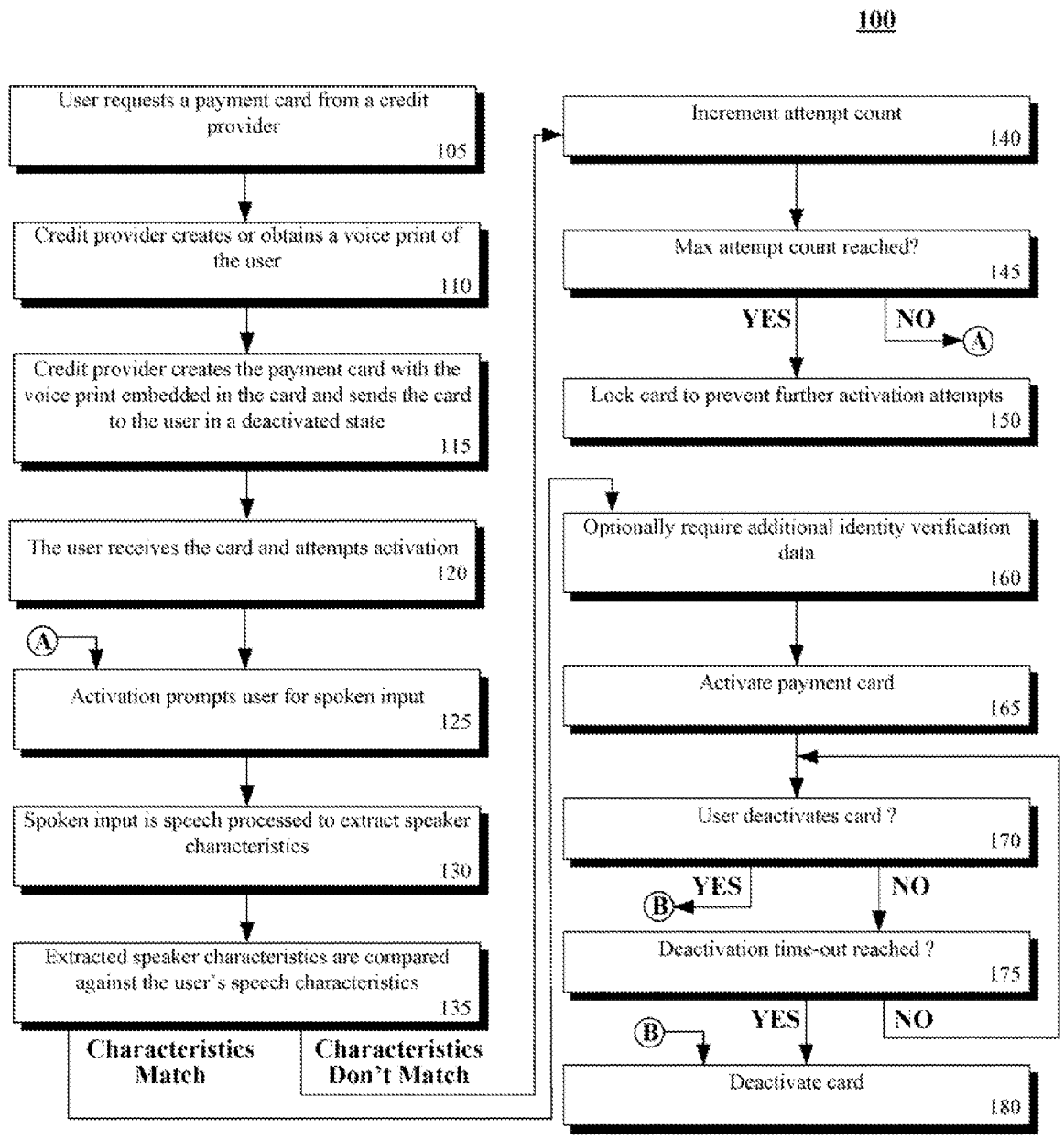
FIG. 1 is a flow chart of a method for using speaker identification speech processing techniques to activate payment cards.

FIG. 1 is a flow chart of a method 100 for using speaker identification and verification SIV speech processing techniques to activate payment cards. The method 100 can begin in step 105, where a user requests a payment card from a credit provider or other card source, in step 110, the credit provider can create or can obtain a voice print of the user. This step can involve voice enrollment, where a user speaks a sufficient number of phrases for an accurate voice print to be constructed. In step 115, the credit provider can create the payment card with the voice print embedded in the card and can send the card to the user in a deactivated state. In an alternative embodiment, the voice print can be stored in a data store external to the card, which can be accessed by a machine during an activation attempt, in step 120, the user can receive the card and can attempt activation.

In step 125, a user can be prompted for spoken input. In one configuration, the prompting can be implicit, where a user automatically speaks alter pressing an activation button or selector on a card. The prompting can also be an explicit audio or visual prompting for spoken input. In step 130, spoken input can be speech processed to extract speaker characteristics, in step 135, the extracted speaker characteristics can be compared against the voice print of the user, which can be stored within the card as noted by step 115.

When the characteristics do not match the voice print, the method can proceed from step 135 to step 140, where a count of failed attempts can be incremented. In step 145, a check to determine if the maximum attempt count has been reached can be performed. If the maximum attempt count has been reached, the process can move onto step 150, and the card can be locked to prevent further activation attempts. If in step 145 the maximum attempt count has not been reached, the process can repeat step 125, where the activation system re-prompts the user for spoken input.

When the characteristics match in step 135, the process can progress from step 135 to step 160 where additional identity verification data may be required, which is compared against a correct response (not shown). Activation or security based upon identity verification data (not speech input) is well known and can be easily combined with the disclosed speech input/voice print based activation by one of ordinary skill in the art if additional security is desired.

In step 165, the payment card can be activated. Activation can enable previously disabled portions of the payment card, such as a magnetic strip, a card number display, or an RFID component. Once activated, the payment card can be utilized by a point of sale (POS) device, such as a magnetic strip reader that is commonly used to read credit cards. Unlike conventional "activation" of a payment card, which occurs at a payment center server activation, step 165 refers to intra-card activation. Even if a payment center (e.g., credit provider) has activated a card to permit charge processing, an internally deactivated card is one that is not usable for charging purposes.

In step 170, a user can opt to deactivate the payment card. This causes the card to be internally deactivated in step 180. When no manual selection to deactivate a payment card is made, the payment card can still be automatically deactivated, as shown by step 175. For example, a time out condition can cause an activated card to be automatically deactivated a fixed time after activation has occurred. Deactivating a card in step ISO represents disabling necessary portions of the payment card, such as a number display, a magnet strip, and the like.

The deactivation options shown in steps 170-180 are optional steps. In one embodiment, the method 100 can be designed to execute once to initially activate the payment card internally so that it can thereafter be used. Further, additional deactivation conditions are contemplated, which are not shown in method 100. For example, a POS device can possess a capability to deactivate the payment card in one embodiment. For example, a card can be deactivated when a questionable charge is attempted, so that a card wielder is required to provide speech input that matches the voice print before, the card can again be used.

Figure 2:
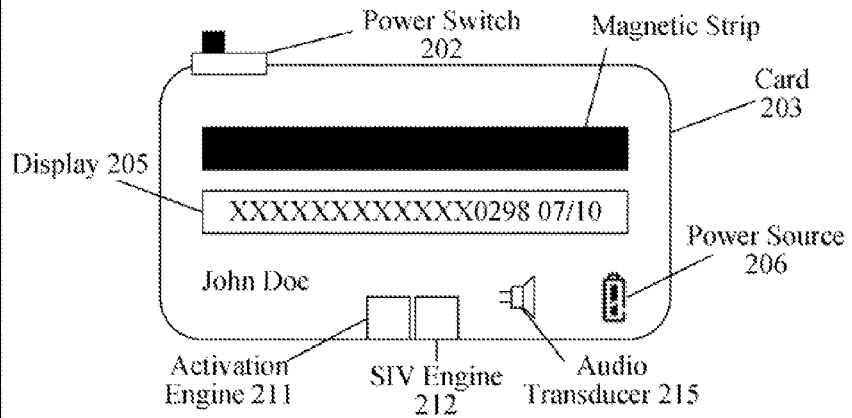
FIG. 2 is a schematic diagram illustrating arrangements of a system that uses speaker identification and verification speech processing techniques to activate a payment card.
Figure 2:
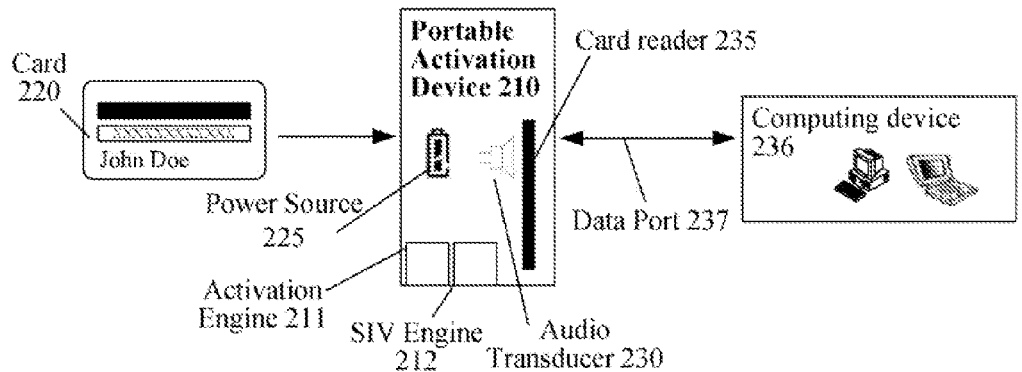
Figure 2:
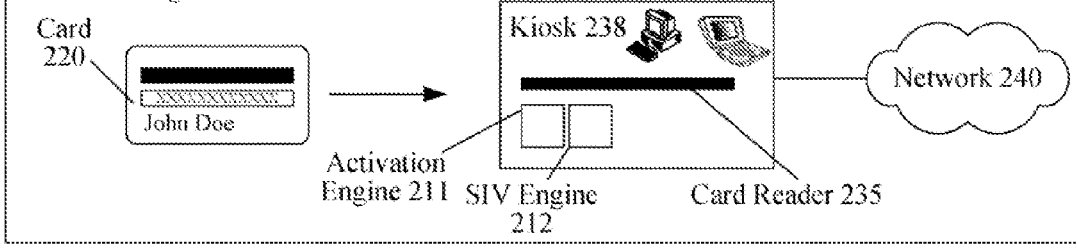
Figure 2:
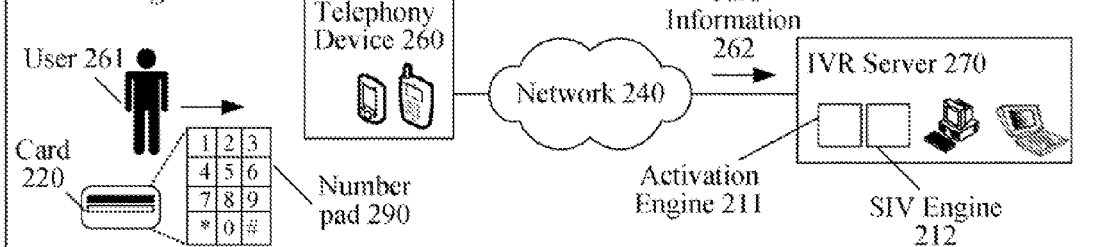

FIG. 2 is a schematic diagram illustrating arrangements of a system 200 that uses SIV speech processing techniques to activate a payment card. The activation/deactivation process for the cards shown in system 200 can occur in a manner elaborated upon in method 100.

In system 200, an embedded SIV arrangement 201 can allow the distribution of a self-contained card 203 and activation system. The payment card 203 can advantageously be utilized by conventional, unmodified, commercial off-the-self (COTS) POS devices. The card 203 can be a self-contained payment card and activation system with an embedded activation engine 211 and embedded SIV engine 212. Card 203 can include display 205, audio transducer 215, power switch 202, and power source 206, a magnetic strip, and the like.

Embedded activation engine 211 can be used to perform tasks necessary to activate card 203 after using audio transducer 215 to receive spoken input for speech identification and verification purposes. The activation engine 211 can also be used to deactivate a previously activated card 203. Activation can enable necessary payment components. For example, activating a card 203 can result in a credit card number being shown in display 205, where the display 205 does not display the credit card number when deactivated. In another example, activating the card 203 can result in necessary information being written/enabled in the magnetic strip. Embedded activation engine 211 can be implemented in many ways such as, but not limited to, an integrated circuit, microprocessor, flash memory, or the like.

Embedded SIV engine 212 can be used to perform speech identification and verification tasks to determine the identity of the user by receiving spoken input through audio transducer 215. Embedded SIV engine 212 can determine the user's identity by comparing speech characteristics extracted from the spoken input to stored speech characteristics of the user, which are contained in a voice print stored in a memory of the card 203. The memory containing the voice print can be a fixed memory that a user is unable to read or alter, which was established when the card 203 was issued. Tampering with the voice print memory (or the engines 211, 212 for that matter) can permanently disable the card 203. Embedded SIV engine 212 can be implemented in many ways such as, but not limited to, an integrated circuit, microprocessor, flash memory, or the like.

Audio transducer 215 can be used to accept spoken input and convert it into electrical energy, usable by SIV engine 212. Audio transducer 215 can be any device capable of receiving audio input, such as a microphone.

Power source 206 can be used to provide power for elements embedded in card 203 that require power. Such elements that can require power in some embodiments are audio transducer 215, SIV engine 212, activation engine 212 and display 205. Power source 206 can be any power cell or portable data source, such as a "watch" battery. Power source 206 can also be external to the card 203, which can include an electrical conduit for receiving power. For example, the card 203 can include a USB port, which receives power from a remote source.

Display 205 can be used to display information about the card's current status. Display 205 can allow easy use of the card's activation system. Display 205 can be used to prompt the user for spoken input for speech identification and verification. Display 205 can exist in different forms in different embodiments, which include an LED or LCD display. The display 205 is not to be construed as limited in this manner, however. For example, in one contemplated embodiment, electronic ink (e-ink) that does not require constant power to be maintained can be used to variably show a credit card number. In another example, the display 205 can include an obscuring element, which prevents (when enabled) an underlying card number (visible when the obscuring element is disabled) from being read.

Power switch 202 can be used to toggle a power state for card 203. In one embodiment, the power switch 202 can be manually turned on/of, such as by pinching a portion of the card 203. In another embodiment, a card can automatically power-off, when not in use after a designated time. Attempted use of the card with a POS device can cause the card 203 to be automatically powered on, which may or may not require the card 203 to be re-activated.

When the components of arrangement 201 are used together, audio transducer 215 can be used to receive the spoken input and can send the spoken input to SIV engine 212. SIV engine 212 can determine the speech characteristics of the spoken input. In one embodiment, SIV engine 212 can determine if the speech characteristics match stored speech characteristics, or voice print. When a match results, the activation engine 211 can activate the card 203.

It should be appreciated that the disclosed payment card 203 is able to be selectively disabled/enabled internally. Activation and enablement can be based upon comparing a voice print against speech characteristics extracted from speech input. This can be implemented in numerous manners, which achieve a similar effect to the arrangement 201. A few of these derivatives are represented by arrangements 221-241. Arrangement 221, for example, is a distributed arrangement where one or more components from arrangement 201 are implemented within a portable activation device 210 external to the payment card 220. The portable activation device 210 can be used to activate multiple different payment cards 220 implemented in accordance with the inventive arrangements disclosed herein. More specifically, somewhat expensive components, such as the activation engine 211 and the SIV engine 212, can be implemented in a re-usable device 210 so that an expense of providing these components is not incurred for each payment card 220. The end result, however, is effectively the same since a user possessing the card 220 and the activation, device 210 can selectively activate/deactivate the payment card 220.

More specifically, the portable activation device 210 can be powered on when card 220 is read using card reader 235. Portable activation device 210 can prompt the user to provide spoken input for speech identification and verification. Portable activation device 210 can include power source 225, activation engine 211, SIV engine 212, and audio transducer 230 to receive the spoken input and process it. Data port 237 can be used to allow portable activation device 210 and computing device 236 to interface and exchange information. In one embodiment, computing device 236 connected via data port 237 can be required for activation. Further, one or more of the engines 211, 212 can execute within the computing device 236.

Another arrangement for an activate-able payment card 220 is shown in kiosk arrangement 231. In arrangement 236, a kiosk 238 can include one or more of the components shown in arrangement 201, such as activation engine 211 or SIV engine 212. Kiosk 238 can be any computing device capable of interacting with the payment card 220 so that together speech based activation actions can be conducted. For example, the kiosk 238 can be an ATM machine which has been modified to permit payment card 220 activation. The kiosk 238 can also be modified to automatically deactivate the payment card 220 based upon predetermined conditions, such as the card 220 being used for a questionable transaction. Deactivation of the card 220 renders the payment card 220 non-operable (i.e., a card number can be obscured, a magnetic strip cleared of information, etc.) etc.) until the card 220 is re-activated. The kiosk 238 can include a card reader 235 and can be connected to a network 240. In one implementation, one or more of the activation functions cat be conducted by a network 240 element remotely located from either the payment card 220 or the kiosk 236.

Still another arrangement for an activate-able payment card 220 is shown in the interactive voice response (IVR) arrangement 241. In arrangement 241, a user 261 can use telephony device 260 to contact IVR server 270, which performs one or more functions needed to activate a payment card 220. User 261 can provide card information 262 and user 261 specific speech input to IVR server 270. The IVR server 270 can extract speech characteristics from the speech input using SIV engine 212, which also compares the extracted speech characteristics against a voice print of the user 261. When the comparison matches, the activation engine 211 can execute an activation action. For example, the activation action can provide an activation number, which the user 261 can input into the card 220 using an included numeric input mechanism 290, which is integrated with the payment card 220.

Figure 3:
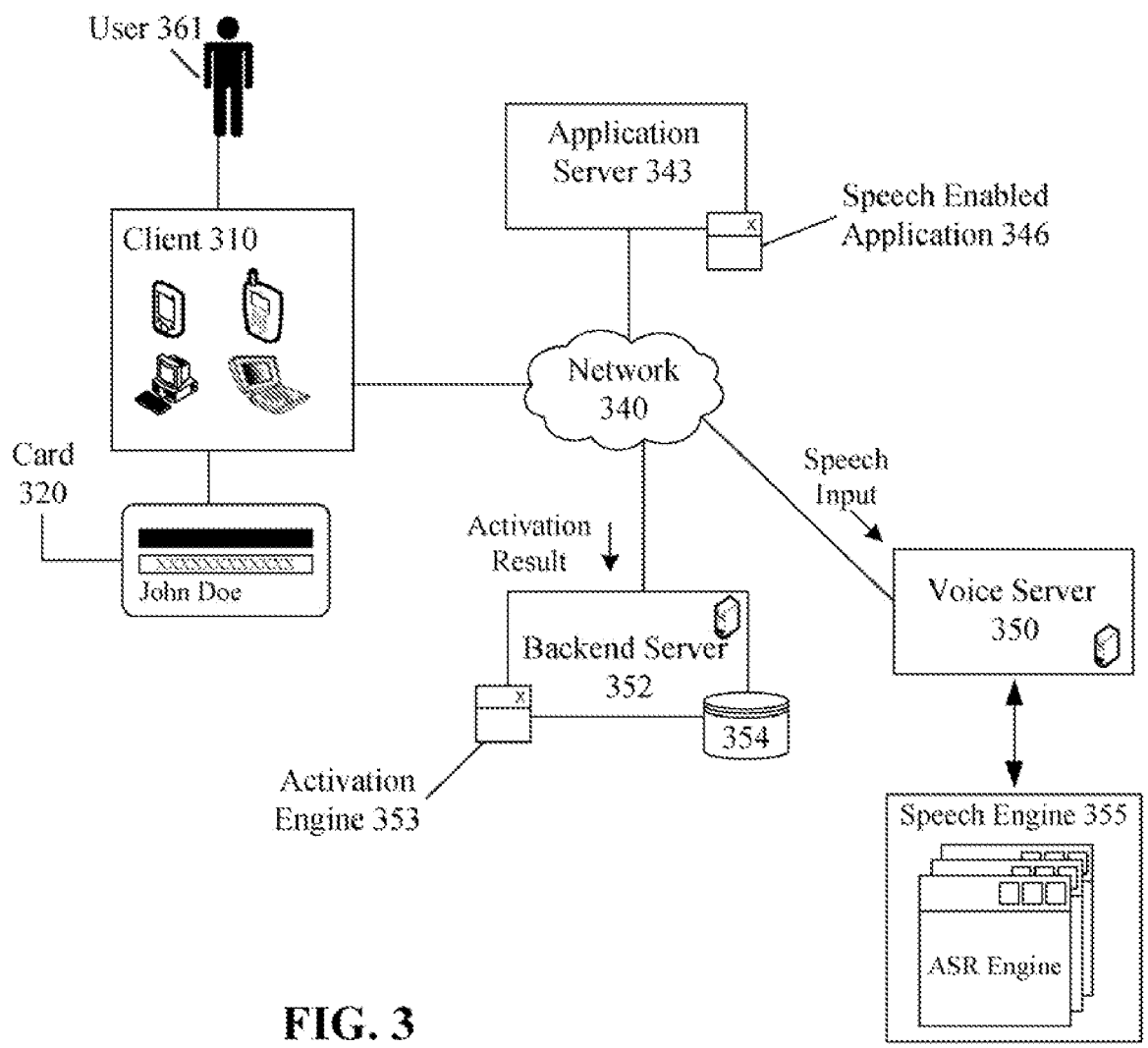
FIG. 3 is a schematic diagram illustrating a system of an embodiment of speaker identification and verification speech processing techniques to activate payment cards.

FIG. 3 is a schematic diagram illustrating a system 300 of an embodiment of speaker identification and verification speech processing techniques to activate credit/debit cards or other negotiable instruments. More specifically, system 300 illustrates that activation/deactivation of the payment card 320 in accordance with method 100 can involve multiple computing components connected via a network 340. For example, the components of system 300 can include a client 310, an application server 343, a backend server 352, and a voice server 350.

The card 320 itself can be selectively disabled. When disabled (i.e., a card number can be obscured, a magnetic strip cleared of information, etc.) the card 320 can be unable to be used for payment transactions. Activation of the card 320 enables it (i.e., a card number can be displayed, a magnetic strip loaded with appropriate payment information, etc.) so that the card 320 is able to be used for payment transactions.

As shown, a user 361 can speak into client 310, which conveys speech input over network 340, as prompted by a speech enabled application 346 executing on an application server 343. The speech input can be sent to the voice server 350 for processing by one or more speech engines 355. A voice print of the user 361 can also be retrieved from a data store 354 of a backend server 352, which can be a server of the credit provider. When the speech characteristics of the speech input match the voice print, an activation command can be conveyed to the client 310. This activation command/key can be transferred to the client 320. The transfer can require a manual entry to the card 320 as shown in arrangement 241. The transfer can also occur digitally, such as over a USB connection established between client 310 and card 320 or over a wireless (e.g., BLUETOOTH) connection between the client 310 and the card 320. Once client 320 receives a proper key, it can be activated so that it is able to be used for credit transactions.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for operating a payment card comprising:
   identifying a payment card in a deactivated state, wherein the deactivated state is an internal state of the payment card;
   receiving speech input;
   determining speech characteristics of the speech input;
   comparing the determined speech characteristics against a voice print of an authorized card user;
   selectively activating the payment card based on results of the comparing step, wherein an activated payment card has undergone an internal state change from the deactivated state, wherein at least one of the receiving, determining and comparing steps is optionally performed external to the payment card; and
   deactivating the payment card based upon the card user input to the payment card to deactivate the payment card.

2. The method of claim 1, wherein the payment card is at least one of a credit card, a debit card, a smart card, and a pre-paid charge card.

3. The method of claim 1, further comprising:
   including a microphone, a data store containing the voice print, and speaker identification components within the payment card, wherein the speech input is received by the microphone, and wherein the speaker identification components perform the determining and comparing steps.

4. The method of claim 1, wherein the payment card is sent via postal mail in the deactivated state, wherein activation based upon the speech input and the voice print is required before the payment card is able to be utilized.

5. The method of claim 1, further comprising:
   requiring a repetition of the receiving, determining, comparing, and activating steps to re-activate the payment card.

6. The method of claim 1, wherein said comparing step determines a similarity value between the speech characteristics and the voice print, wherein the activating step activates the payment card when the similarity value is greater than a previously established threshold, and wherein the activating step does not activate the payment card when the similarity value is not greater than the previously established threshold.

7. The method of claim 1, further comprising:
   prompting for additional identity verification data; and
   activating the payment card only when the additional identity verification data matches previously established values and when a positive comparison between, the voice print and the speech characteristics results from the comparing step.

8. The method of claim 7, wherein the speech input, is provided responsive to the prompting step, and wherein the speech input comprises spoken content that contains the additional identity verification data, said method further comprising:

speech-to-text converting the speech input to obtain a text version of the additional verification data used in the activating step of claim 7.

9. The method of claim 1, wherein said steps of claim 1 are steps performed automatically by at least one machine in accordance with at least one computer program having a plurality of code sections that are executable by the at least one machine, said at least one computer program being stored in a machine readable medium.

10. A payment card comprising:

an internal enabled state in which a payment mechanism is active so that the payment card is able to be used for payment transactions;

an internal disabled state in which a payment mechanism is deactivated so that the payment card is unable to be used for payment transactions; and a state change mechanism configured to change the payment card between the internal disabled state and the internal enabled state, wherein the payment card is changed from internal disabled state to the internal enabled state based upon how speech characteristic extracted from speech input compare with a voice print of an authorized card user, wherein the payment card is changed from the internal enabled state to the internal disabled state based upon a user input to the payment card to deactivate the payment card, and wherein the state change mechanism is optionally configured to receive a result of the comparison of the extracted speech characteristic with the voice print from a device implemented external to the payment card.

11. The payment card of claim 10, wherein the payment card is at least one of a credit card, a debit card, a smart card, and a pre-paid charge card.

12. The payment card of claim 10, comprising:

a magnetic strip that permits the payment card to be utilized by a plurality of point of sale devices that include magnetic card readers, wherein when the payment card is in the internal enabled state, the magnetic strip comprises identification and utilization information that is readable by the plurality of point of sale devices, and wherein when the payment card is in the internal disabled state the magnetic strip does not comprise identification and utilization information that is readable by the plurality of point of sale devices.

13. The payment card of claim 10, comprising:

a radio frequency identification (RFID) chip that permits the payment card to be utilized by a plurality of point of sale devices that include radio frequency identification readers, wherein when the payment card is in the internal enabled state, the radio frequency identification chip comprises identification and utilization information that is readable by the plurality of point of sale devices, and wherein when the payment card is in the internal disabled state the radio frequency identification chip does not comprise identification and utilization information that is readable by the plurality of point of sale devices.

14. The payment card of claim 10, comprising:

a display component that selectively visually displays a unique identification number for the payment card, wherein the unique identification number is one able to be presented to vendors that accept the payment card which results in a completed payment transaction, wherein when the payment card is in the internal enabled state the unique identification number is visible, and wherein when the payment card is in the internal disabled state the unique identification number is not visible.

15. The payment card of claim 10, comprising:

a memory store comprising a digitally encoded voice print of an authorized card user;

an audio transducer configured to receive speech input; and a speaker identification and verification (SIV) engine configured to compare speech characteristics extracted from the speech input against the voice print.

16. The payment card of claim 10, comprising:

a deactivation timer configured to automatically change the payment card from the internal enabled state to the internal disabled state a designated period of time after the payment card is activated.

17. A payment card system comprising:

a memory store comprising a digitally encoded voice print of an authorized card user;

an audio transducer configured to receive speech input;

a speaker identification and verification (SIV) engine configured to compare speech characteristics extracted from the speech input against the voice print; and an activation engine configured to change the payment card between an internal disabled state and an internal enabled state, wherein the activation engine changes the payment card from internal enabled state to internal disabled state based on a user input to deactivate the payment card, wherein the payment card is able to be utilized for payment transactions when in the internal enabled state and is unable to be utilized for payment transactions when in the internal disabled state and wherein at least one of the memory store, the audio transducer, the speaker identification and verification engine, and the activation engine is optionally implemented in a device external to the payment card.

18. The payment card system of claim 17, comprising a payment component that comprises at least one of a magnetic strip, a card number display, and a radio frequency identification (RFID) chip, wherein activation engine changes information of the payment component when the activation engine changes from the internal disabled state to the internal enabled state.

19. The payment card system of claim 17, wherein the memory store, the audio transducer, the speaker identification and verification engine, and the activation engine are implemented using internal components embedded within a payment card.

20. The payment card system of claim 17, wherein the memory store, the audio transducer, the speaker identification and verification engine, and the activation engine are implemented in a plurality of different devices which must cooperate for a payment card to change from the internal enabled state to the internal disabled state, wherein said plurality of different devices comprise the payment card and at least one of a portable activation device, a kiosk, and an interactive voice response (IVR) server.

* * * * *